United States Patent
Hu et al.

(10) Patent No.: US 11,847,818 B2
(45) Date of Patent: Dec. 19, 2023

(54) METHOD FOR EXTRACTING VIDEO CLIP, DEVICE FOR EXTRACTING VIDEO CLIP, AND STORAGE MEDIUM

(71) Applicant: BEIJING XIAOMI PINECONE ELECTRONICS CO., LTD., Beijing (CN)

(72) Inventors: Jiagao Hu, Beijing (CN); Fei Wang, Beijing (CN); Pengfei Yu, Beijing (CN); Daiguo Zhou, Beijing (CN)

(73) Assignee: BEIJING XIAOMI PINECONE ELECTRONICS CO., LTD., Beijing (CN)

( * ) Notice: Subject to any disclaimer, the term of this patent is extended or adjusted under 35 U.S.C. 154(b) by 472 days.

(21) Appl. No.: 17/241,580

(22) Filed: Apr. 27, 2021

(65) Prior Publication Data

US 2022/0067387 A1 Mar. 3, 2022

(30) Foreign Application Priority Data

Aug. 25, 2020 (CN) .......................... 202010866461.2

(51) Int. Cl.
*G06N 20/00* (2019.01)
*G06V 20/40* (2022.01)
(Continued)

(52) U.S. Cl.
CPC .......... *G06V 10/764* (2022.01); *G06F 18/214* (2023.01); *G06N 20/00* (2019.01);
(Continued)

(58) Field of Classification Search
None
See application file for complete search history.

(56) References Cited

U.S. PATENT DOCUMENTS

2017/0109584 A1 * 4/2017 Yao ................... H04N 21/4666
2022/0067383 A1 * 3/2022 Hu ........................ G06N 3/045

FOREIGN PATENT DOCUMENTS

CN 110516749 A 11/2019
KR 101993001 B1 * 6/2019
(Continued)

OTHER PUBLICATIONS

European Patent Application No. 21171289.8 extended Search and Opinion dated Oct. 21, 2021, 12 pages.
(Continued)

*Primary Examiner* — Dov Popovici
(74) *Attorney, Agent, or Firm* — COZEN O'CONNOR (57) ABSTRACT

A method for extracting a video clip includes obtaining a video and splitting the video into multiple clips. The multiple clips are input into a pre-trained scoring model, to obtain a score of each of the multiple clips. The scoring model is obtained by training based on data pairs including first clips and second clips, the data pairs including first clips and second clips are obtained based on labeled clips labeled with target attributes, and the target attributes include attributes that characterize clips as target clips or non-target clips. A target clip is extracted from the multiple clips based on the score of each of the multiple clips. An apparatus for extracting a video clip and a computer readable storage medium are also disclosed.

18 Claims, 5 Drawing Sheets

(51) Int. Cl.
    *G06F 18/214*    (2023.01)
    *G06V 10/764*    (2022.01)
    *G06V 10/82*    (2022.01)

(52) U.S. Cl.
    CPC .............. *G06V 10/82* (2022.01); *G06V 20/41* (2022.01); *G06V 20/47* (2022.01); *G06V 20/48* (2022.01); *G06V 20/49* (2022.01)

(56) References Cited

FOREIGN PATENT DOCUMENTS

| | | |
|---|---|---|
| KR | 101993001 B1 | 6/2019 |
| KR | 20200099568 A | 8/2020 |

OTHER PUBLICATIONS

Shah, M. "Studying the Impact of Video Analytics for Pre, Live and Post Event Analysis on Outcomes of Criminal Justice" Oct. 1, 2018, 56 pages.

Ramachandra, B. et al. "Learning a distance function with a Siamese network to localize anomalies in videos" 2020 IEEE Winter Conference on Applications of Computer Vision, Mar. 1, 2020, pp. 2587-2596.

Hiteshi, J. et al. "Action Quality Assessment using Siamese Network-Based Deep Metric Learning" Cornell University Library, Feb. 27, 2020, 12 pages.

Korean Patent Application No. 10-2021-0056613, Office Action dated Jul. 1, 2022, 4 pages.

Korean Patent Application No. 10-2021-0056613, English translation of Office Action dated Jul. 1, 2022, 4 pages.

\* cited by examiner

METHOD FOR EXTRACTING VIDEO CLIP, DEVICE FOR EXTRACTING VIDEO CLIP, AND STORAGE MEDIUM

CROSS-REFERENCE TO RELATED APPLICATION

This application is based upon and claims priority to Chinese Patent Application No. 202010866461.2, filed on Aug. 25, 2020, the entire contents of which are incorporated herein by reference.

TECHNICAL FIELD

The disclosure relates to the field of video processing technologies, and more particularly to a method for extracting a video clip, a device for extracting a video clip, and a computer-readable storage medium.

BACKGROUND

With the rapid development of network technologies, the production of a large number of videos has greatly enriched people's daily lives. However, when the user is unable to watch a video completely due to factors such as time, the user may hope to quickly obtain the main content of this video by browsing some clips (such as highlight clips) of the video in a short period of time.

In the related art, a model for extracting video clips is trained, and the model is used to extract target clips in the videos, for example, to extract highlight clips of the videos. However, the current data of training the model for extracting video clips contains a lot of noisy data, and a complex network structure is required to improve the accuracy of clip selection. As a result, the user may not quickly and accurately obtain clips he/she needs when using the trained model to extract video clips, which affects user experience. Moreover, due to excessive noisy data, the training is difficult and the training cost is high, so it is impossible to quickly obtain an effective model for extracting video clips in a short period of time.

SUMMARY

According to a first aspect of embodiments of the disclosure, there is provided a method for extracting a video clip, including: obtaining a video, and splitting the video into multiple clips; inputting the multiple clips into a pre-trained scoring model, to obtain a score of each of the multiple clips, in which the scoring model is obtained by training based on data pairs including first clips and second clips, the data pairs including first clips and second clips are obtained based on labeled clips labeled with target attributes, and the target attributes include attributes that characterize clips as target clips or non-target clips; and extracting a target clip from the multiple clips based on the score of each of the multiple clips.

According to a second aspect of embodiments of the disclosure, there is provided a device for extracting a video clip, including: a memory, configured to store instructions; and a processor, configured to call the instructions stored in the memory to execute any one of the above methods for extracting the video clip.

According to a third aspect of embodiments of the disclosure, there is provided a computer-readable storage medium having stored therein instructions that, when executed by a processor, causes the processor to perform any one of the above methods for extracting the video clip.

It is to be understood that both the foregoing general description and the following detailed description are exemplary and explanatory only and are not restrictive of the disclosure, as claimed.

BRIEF DESCRIPTION OF THE DRAWINGS

The accompanying drawings, which are incorporated in and constitute a part of this specification, illustrate embodiments consistent with the disclosure and, together with the description, serve to explain the principles of the disclosure.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the disclosure. Instead, they are merely examples of apparatuses and methods consistent with aspects related to the disclosure as recited in the appended claims To overcome existing problems in the related art, a method for extracting a video clip, an apparatus for extracting a video clip, and a computer-readable storage medium are provided in the disclosure.

According to a first aspect of embodiments of the disclosure, there is provided a method for extracting a video clip, including: obtaining a video, and splitting the video into multiple clips; inputting the multiple clips into a pre-trained scoring model, to obtain a score of each of the multiple clips, in which the scoring model is obtained by training based on data pairs including first clips and second clips, the data pairs including first clips and second clips are obtained based on labeled clips labeled with target attributes, and the target attributes include attributes that characterize clips as target clips or non-target clips; and extracting a target clip from the multiple clips based on the score of each of the multiple clips.

In some embodiments, the data pairs including first clips and second clips are obtained based on the labeled clips labeled with the target attributes by actions of: obtaining a sample video including one or more labeled clips; and obtaining the data pairs including first clips and second clips based on target attributes labeled by the one or more labeled clips and unlabeled clips included in the sample video, in which a possibility of becoming a target clip for a first clip is greater than a possibility of becoming a target clip for a second clip.

In some embodiments, obtaining the data pairs including first clips and second clips based on the target attributes labeled by the one or more labeled clips and the unlabeled clips included in the sample video, includes: in response that the target attributes labeled by the one or more labeled clips include attributes that characterize clips as target clips, employing the one or more labeled clips as first clips and exacting part of clips of unlabeled clips included in the sample video as second clips, to obtain one or more data pairs including first clips and second clips; or in response that the target attributes labeled by the one or more labeled clips include attributes that characterize clips as non-target clips, employing the one or more labeled clips as second clips and exacting part of clips of unlabeled clips included in the sample video as first clips, to obtain one or more data pairs including first clips and second clips; or in response that the target attributes labeled by the one or more labeled clips include attributes that characterize clips as target clips and attributes that characterize clips as non-target clips, employing labeled clips that are labeled with the attributes that characterize clips as target clips as first clips and labeled clips that are labeled with the attributes that characterize clips as non-target clips as second clips, and exacting part of clips of unlabeled clips included in the sample video, to obtain one or more data pairs including first clips and second clips; in which the data pairs include at least one or a combination of: data pairs including the first clips and the second clips, data pairs including the first clips and the part of clips as the second clips, and data pairs including the second clips and the part of clips as the first clips.

In some embodiments, the scoring model is obtained by training based on the data pairs including first clips and second clips by actions of: extracting feature vectors of the first clips and feature vectors of the second clips in the data pairs including first clips and second clips based on a video comprehension model; and inputting the feature vectors of the first clips and the feature vectors of the second clips to a siamese network to obtain scores of the first clips and scores of the second clips, and using a ranking loss back propagation to obtain a trained siamese network after training; in which the siamese network includes two multi-layer perceptron models of sharing parameters; the scoring model is one of the two multi-layer perceptron models in the trained siamese network.

In some embodiments, inputting the multiple clips into the pre-trained scoring model to obtain the score of each of the multiple clips, includes: inputting the multiple clips to a video comprehension model, extracting a feature vector of each of the multiple clips based on the video comprehension model, and inputting the feature vector of each of the multiple clips to a multi-layer perceptron model to obtain the score of each of the multiple clips.

In some embodiments, splitting the target video into the multiple clips includes: splitting the video into the multiple clips by adopting a video shot boundary detection manner to obtain the multiple clips of the video; or splitting the video into the multiple clips based on a sliding window to obtain the multiple clips of the video.

According to a second aspect of embodiments of the disclosure, there is provided an apparatus for extracting a video clip, including: an obtaining unit, configured to obtain a video, and split the video into multiple clips; an evaluation unit, configured to input the multiple clips into a pre-trained scoring model to obtain a score of each of the multiple clips, in which the scoring model is obtained by training based on data pairs including first clips and second clips, the data pairs including first clips and second clips are obtained based on labeled clips labeled with target attributes, and the target attributes include attributes that characterize clips as target clips or non-target clips; and an extraction unit, configured to extract a target clip from the multiple clips based on the score of each of the multiple clips.

In some embodiments, the data pairs including first clips and second clips are obtained based on the labeled clips labeled with the target attributes by actions of: obtaining a sample video including one or more labeled clips; and obtaining the data pairs including first clips and second clips based on target attributes labeled by the one or more labeled clips and unlabeled clips included in the sample video, in which a possibility of becoming a target clip for a first clip is greater than a possibility of becoming a target clip for a second clip.

In some embodiments, the data pairs including first clips and second clips are obtained based on the target attributes labeled by the one or more labeled clips and the unlabeled clips included in the sample video, includes: in response that the target attributes labeled by the one or more labeled clips include attributes that characterize clips as target clips, employing the one or more labeled clips as first clips and exacting part of clips of unlabeled clips included in the sample video as second clips, to obtain one or more data pairs including first clips and second clips; or in response that the target attributes labeled by the one or more labeled clips include attributes that characterize clips as non-target clips, employing the one or more labeled clips as second clips and exacting part of clips of unlabeled clips included in the sample video as first clips, to obtain one or more data pairs including first clips and second clips; or in response that the target attributes labeled by the one or more labeled clips include attributes that characterize clips as target clips and attributes that characterize clips as non-target clips, employing labeled clips that are labeled with the attributes that characterize clips as target clips as first clips and labeled clips that are labeled with the attributes that characterize clips as non-target clips as second clips, and exacting part of clips of unlabeled clips included in the sample video, to obtain one or more data pairs including first clips and second clips; in which the data pairs include at least one or a combination of: data pairs including the first clips and the second clips, data pairs including the first clips and the part of clips as the second clips, and data pairs including the second clips and the part of clips as the first clips.

In some embodiments, the scoring model is obtained by training based on the data pairs including first clips and second clips by actions of: extracting feature vectors of the first clips and feature vectors of the second clips in the data pairs including first clips and second clips based on a video comprehension model; and inputting the feature vectors of the first clips and the feature vectors of the second clips to a siamese network to obtain scores of the first clips and scores of the second clips, and using a ranking loss back propagation to obtain a trained siamese network after training; in which the siamese network includes two multi-layer perceptron models of sharing parameters; the scoring model is one of the two multi-layer perceptron models in the trained siamese network.

In some embodiments, the multiple clips are inputted into the pre-trained scoring model by the evaluation unit to obtain the score of each of the multiple clips by actions of: inputting the multiple clips to a video comprehension model, extracting a feature vector of each of the multiple clips based on the video comprehension model, and inputting the feature vector of each of the multiple clips to a multi-layer perceptron model to obtain the score of each of the multiple clips.

In some embodiments, the video is splitted by the obtaining unit into the multiple clips by actions of: splitting the video into the multiple clips by adopting a video shot boundary detection manner to obtain the multiple clips of the video; or splitting the video into the multiple clips based on a sliding window to obtain the multiple clips of the video.

According to a third aspect of embodiments of the disclosure, there is provided a device for extracting a video clip, including: a memory, configured to store instructions; and a processor, configured to call the instructions stored in the memory to execute any one of the above methods for extracting the video clip.

According to a fourth aspect of embodiments of the disclosure, there is provided a computer-readable storage medium having stored therein instructions that, when executed by a processor, causes the processor to perform any one of the above methods for extracting the video clip.

The technical solutions provided in embodiments of the disclosure may include the following beneficial effects. In the disclosure, the scoring model is trained based on labeled clips with clear target attributes. Therefore, during the training process, the noisy data is less and the accuracy is high, so that the network structure of the scoring model is simple and converges faster, thereby accelerating the training process and helping to reduce the training cost. In addition, due to the simple network structure of the scoring model, when using the scoring model to score each clip of the obtained video, the calculation time may be shortened, thereby helping to quickly extract target clips that the user wants to watch, and improving the user experience.

The following describes the solutions in the embodiments of the disclosure in detail.

A method for extracting a video clip is provided in the embodiments of the disclosure, which is applicable to a scene where a target clip is extracted, for example, a scene where a highlight clip is extracted. For example, highlight clips of user videos in the mobile phone album may be generated as preview images to show to the user; or highlight clips of small videos in a small video application may be obtained to generate gif (Graphic Interchange Format) images as video covers to show to the user.

Target clip exaction often adopts the manner based on model exaction, so a model for exacting video clips needs to be trained.

In the related art, methods for training the model for exacting video clips mainly include the following three methods: matching method, classification method, and ranking method. In the embodiments of the disclosure, the model training method will be described by taking the process of training to extract highlight clips of the video as an example.

In the matching method, the pre-defined multiple specified highlight types are matched with the obtained video content based on the pre-defined multiple specified highlight types, and the matching degree between the video content and each specified highlight type is determined, and the highlight degree of each clip in the video is further calculated, so that the clip with the most highlight degree is regarded as the highlight clip of the video. However, due to the need of pre-defining the highlight types, only the clips related to the pre-defined highlight types may be calculated, which leads to the limitations in the video types that may extract highlight clips.

In the classification method, a large number of highlight clips and non-highlight clips are collected in advance as a training set, and a dichotomous model that may distinguish between highlight and non-highlight of clips is trained. Therefore, during using, it may determine which clip in the video belongs to highlight clips and which clip belongs to non-highlight clips. However, this method may not be used to clarify differences of the highlight degrees among various clips, and further distinguish which clip of highlight clips is the most exciting.

In the above training method of the model for extracting video clips, the training data is difficult to label, and the obtained data is not accurate enough. In addition, the quality of the training data is poor, which needs a complex model, and the training may be more difficult.

In view of this, a method for extracting a video clip is provided in the embodiments of the disclosure. The model for extracting video clips used in the method for extracting a video clip may be easily labeled when being trained. Therefore, high-quality training data may be obtained, the simple multi-layer perceptron model is enough to be used, and the model training is not difficult.

The method for extracting a video clip provided in the disclosure may input video clips into a scoring model to obtain a score of each clip, and extract a target clip based on the score of each clip. The scoring model adopted is obtained by training based on data pairs including first clips and second clips that are pre-labeled with target attributes. The first clips may be also referred to positive clips, and the second clips may be also referred to negative clips. Based on the labeled clips, during the training process, it helps to reduce the interference of noisy data and improves the accuracy of training data. There is no need to adopt other network structures to improve the accuracy of training data. Therefore, the network structure of the scoring model is simple, the training is not difficult, and convergence may be quickly, thereby accelerating the training process and helping to reduce the training cost. Because the network structure of the scoring model is simple, when the scoring model is used to score each clip of the obtained video, the time for calculating the score of each clip may be shortened, thereby helping the user to quickly extract the target clip the user wants to watch, and improving user experience.

Figure 1:
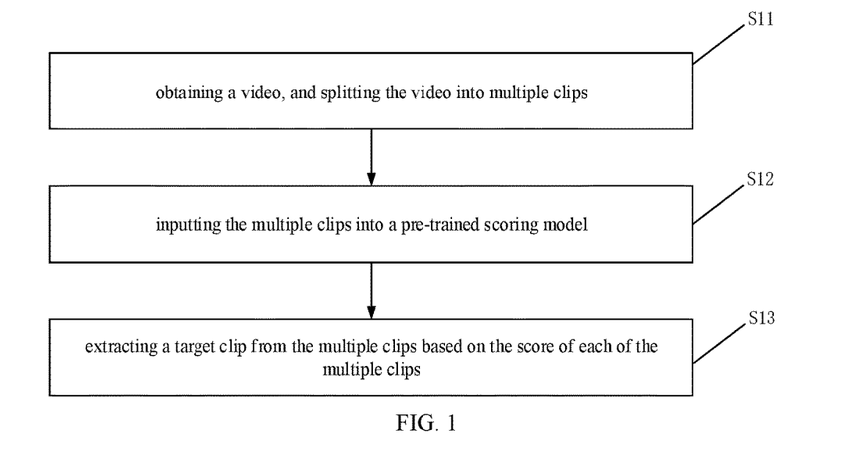
FIG. 1 is a flow chart illustrating a method for extracting a video clip according to some embodiments of the disclosure.

FIG. 1 is a flow chart illustrating a method for extracting a video clip according to some embodiments of the disclosure. As illustrated in FIG. 1, the method includes actions in the following block S11 to block S13.

In block S11, a video is obtained, and the video is splitted into multiple clips.

In the embodiments of the disclosure, there are a target clip to be extracted and non-target clip(s) to be extracted in the video. The target clip may have attributes of target clips, and the non-target clip may also have attributes of non-target clips. For example, when the target clip is a highlight clip, the video has the most highlight clip, and also has the relatively least highlight clip. As for different users, different target clips are required. In order to quickly extract the target clip required by the user based on the obtained video, the video is splitted into the multiple clips, and then the score of each clip may be obtained through the scoring model, thereby facilitating rapid extraction.

Generally, the target clip may be one or more clips in the video and have the attributes of target clips. For example, the highlight clip may be one or more relatively short clips in the video, and the content is more exciting and more attractive than the content of other clips. Taking a basketball game video as an example. Clips such as slam dunks and smashes in this video are highlight clips in the basketball game video, while clips such as ordinary dribbling are non-highlight clips, and black screen when the camera is switched, animation, and the like are the least highlight clips.

In the embodiments of the disclosure, multiple methods may be used to split the video into clips.

Figure 2:
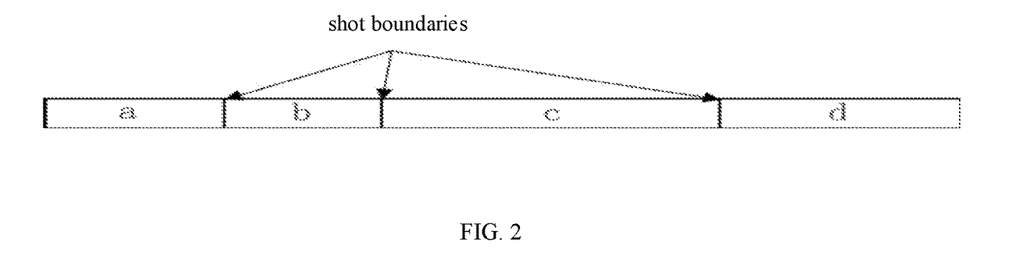
FIG. 2 is a schematic diagram illustrating a clip splitting according to some embodiments of the disclosure.

In some embodiments, a video shot boundary detection manner may be used to detect the shot boundaries of the video, and the shot boundaries may be used as splitting points, to split the video into the multiple clips. This helps to protect the consistency and integrity of the content of each clip. For example, as illustrated in FIG. 2, the current video is detected to have 3 shot boundaries by the shot boundary detection manner, and the video is splitted into 4 clips (a, b, c, and d) based on the detected 3 shot boundaries. In the disclosure, the video shot boundary detection manner may include: absolute inter-frame difference method, color histogram method, or perceptual hash method. Through the absolute inter-frame difference method, the difference between the sums of the brightness of pixels of adjacent image frames may be compared, and, when the difference of the sums of the brightness of pixels of the adjacent image frames is greater than the specified threshold, it is considered that the shot picture has a sudden change, so as to determine that the current position belongs to the shot boundary. With the color histogram method, the color histogram of the image may be used as an image feature, and the histograms may be used to measure the similarity between adjacent images. Furthermore, when the similarity is less than the specified threshold, it is considered that the shot picture has a sudden change, so as to determine that the current position belongs to the shot boundary. Through the perceptual hash method, the similarity between two image frames may be determined, and, when the similarity of the images is lower than the specified threshold, it is considered that the shot picture has a sudden change, so as to determine that the current position belongs to the shot boundary.

Figure 3:
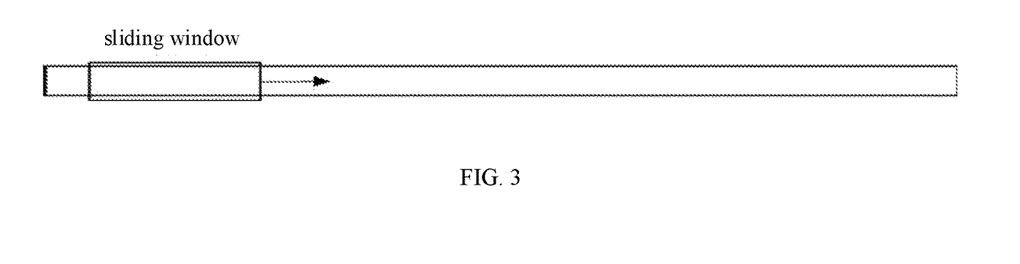
FIG. 3 is a schematic diagram illustrating another clip splitting according to some embodiments of the disclosure.

In some embodiments, a fixed-length sliding window slides on the video along the time sequence with a specified step length, and the range covered by the sliding window each time it slides is a clip. As illustrated in FIG. 3, when the sliding window slides every time and is slides from the end position of the sliding window to the start position of the sliding window, a clip is generated. In an example, when the remaining duration of the last splitting of the video is less than the duration of the sliding window, the clip is still retained. By splitting the clips through the sliding window, the splitting duration may be customized, so that the obtained target clips satisfy the duration required by the user, thereby helping to improve the user experience.

In block S12, the multiple clips are inputted into a pre-trained scoring model, to obtain a score of each of the multiple clips.

In the embodiments of the disclosure, through the trained scoring model, the splitted clips are scored to obtain the score of each clip. The scoring model may score based on the highlight degree of content of each clip. For different clips of the same video, the higher the score outputted by the scoring model, the greater highlight degree of the content is. The relative sizes of various scores may be characterized as the differences in relative highlight degrees among the content of the clips. By obtaining the score of each clip, the highlight degree of the content of each clip may be intuitively distinguished, thereby helping to quickly extract the target clip needed by the user.

In the disclosure, the scoring model is obtained by training based on data pairs including first clips and second clips. In the process of obtaining the data pair, the obtained labeled clip is labeled based on the content of the clip, and it is further determined whether the labeled clip is a first clip or a second clip. Target attributes include attributes that characterize clips as target clips or non-target clips. In some embodiments, the target clip may be the most highlight clip in the video; the non-target clip may be the least highlight clip in the video. Therefore, according to the obtained data pairs, the differences between first clips and second clips may be clearly distinguished, so that the scoring model may quickly learn the clip features among different attributes when the scoring model is trained. Further, based on the attribute label of the labeled clip, the accuracy of the training data may be improved, and the interference of noisy data on the model training may be reduced, thereby helping to improve the cleanliness of the training data, making the structure of the training model simpler. Thus, it is unnecessary to use an additional network model to calculate the reliability of the labeled clip. This helps to accelerate the convergence of the training process of the scoring model, and helps to save costs.

In block S13, a target clip is extracted from the multiple clips based on the score of each clip.

In the embodiments of the disclosure, the target clip needed by the user may be extracted based on the obtained score of each clip according to the needs of the user.

In the embodiments of the disclosure, description is made by taking target clips as highlight clips as an example. Extracting highlight clips based on scores of multiple clips in the videos helps the user quickly understand the highlight content of the videos through the extracted target clips. For example, when the user needs the most highlight clip in the video, the clip with the highest score may be used as the target clip according to the score of each clip. In some embodiments, when the user needs multiple highlight clips, the clips may be ranked based on the corresponding scores, and multiple clips with relatively higher scores are used as target clips.

For example: there are 6 splitted clips, which are clip 1, clip 2, clip 3, clip 4, clip 5, and clip 6. The clips are ranked based on their corresponding scores, clip 4 has the highest score, followed by clip 3, clip 2, clip 6, clip 5, and clip 1. According to user's needs, when three highlight clips need to be obtained, the clip 4 with the highest score and clip 3 and clip 2 with relatively higher scores are extracted to satisfy the needs of the user.

In the embodiments of the disclosure, according to practical application, after target clip(s) are extracted, the extracted target clip(s) may be displayed to the user. The display method may include: taking the extracted clip as the highlight moment of the video, and storing it separately. Or saving the extracted clip as a gif image, or replacing the original cover of the video. In the embodiments of the disclosure, multiple clips may be stored uniformly in a collection manner.

Figure 4:
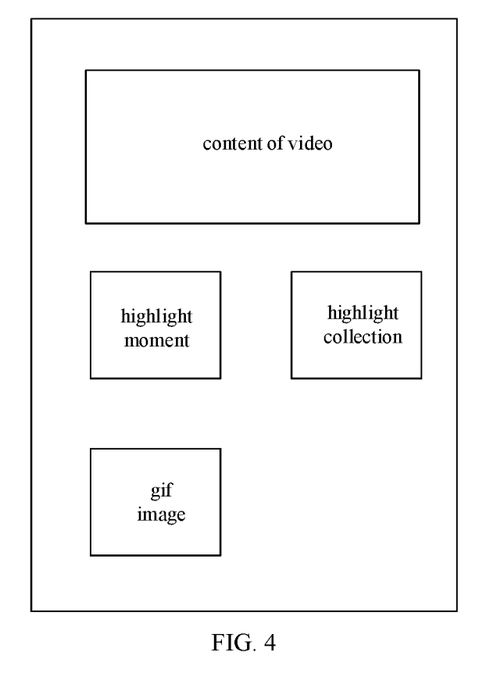
FIG. 4 is a schematic diagram illustrating a clip display according to some embodiments of the disclosure.

In the implementation scenario, description is made by taking target clips as highlight clips as an example. As illustrated in FIG. 4, according to the video obtained by the mobile phone, the clip with the highest score in the video is extracted through the scoring model, and the highlight clip of the video is generated in the mobile phone album, which may be displayed to the user as a preview of the video. The clip may be a short video stored separately, or a generated gif image. When displayed as the preview of the video, it may include the short video, the gif image, or both the short video and the gif image. When the user slides up the mobile phone album, information such as the highlight moment of the video appears. The highlight moment is the clip with the highest score in the video. This will help the user quickly understand the highlight content of the video. When there are too many highlight clips, the extracted multiple clips may be stored in the highlight collection of the video, which is convenient for the user to view at one time.

Figure 5:
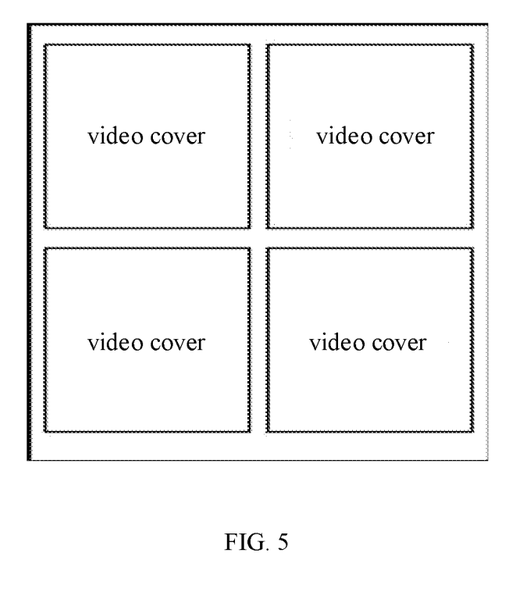
FIG. 5 is a schematic diagram illustrating another clip display according to some embodiments of the disclosure.

In another implementation scenario, description is still made by taking target clips as highlight clips as an example. When the video obtained by the terminal is a short-duration video, the highlight clip of the video may be generated to a gif image, which is displayed to the user as the video cover, thereby helping attract the user to click to watch the video. As illustrated in FIG. 5, 4 video covers are displayed on the terminal application software page. The cover of each video may be extracted from the clip with the highest score in the video through the scoring model, and the most highlight clip is generated to a gif image, and then the original video cover is replaced, so that the user may quickly know the highlight content of the video through the cover, which helps attract the user to click to watch the video.

Through the above method for extracting a video clip, the score of each clip in the video may be quickly obtained through the trained scoring model with the simple structure, and then the target clip needed by the user may be extracted according to the scores to improve the user experience. The scoring model is trained based on the data of first clips and second clips labeled with target attributes in advance during the training process. The training data includes less noisy data, which makes the scoring model obtained after training more accurate, and helps to distinguish the highlight degree of content of each clip, thereby helping to extract accurately.

In the embodiments of the disclosure, the training process of the scoring model will be described below.

Before training the scoring model, a data pair suitable for training the scoring model is obtained in advance, so that, when the scoring model is trained, the scoring model may distinguish the difference between the highlight degrees of different video content, so as to improve the accuracy of scoring. Furthermore, data pairs used for training are obtained based on the labeled clips labeled with the target attributes in the sample video, which helps to avoid the mixing of noisy data and improves the quality of training data, thereby helping to reduce the difficulty of training and accelerating the training process.

Figure 6:
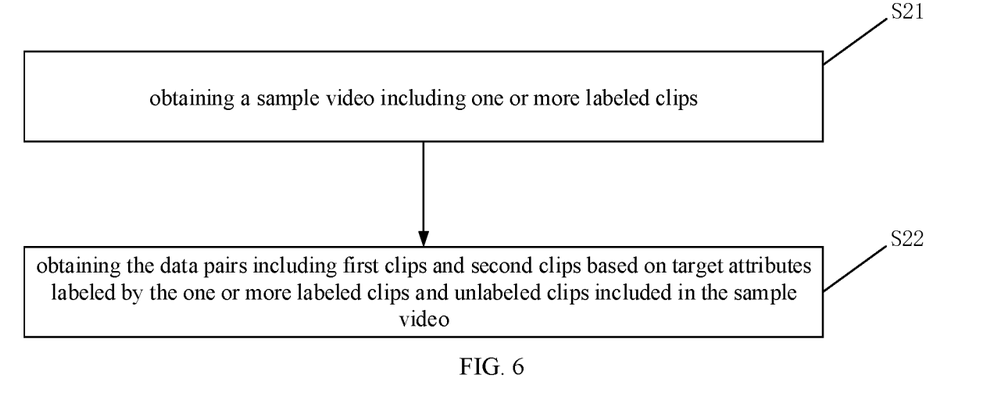
FIG. 6 is a flow chart illustrating a method for obtaining data pairs according to some embodiments of the disclosure.

FIG. 6 is a flow chart illustrating a method for obtaining data pairs according to some embodiments of the disclosure. As illustrated in FIG. 6, the method for obtaining data pairs includes actions in the following block S21 to block S22.

In block S21, a sample video including one or more labeled clips is obtained.

In some embodiments, before training the scoring model, a certain amount of sample videos are obtained in advance to obtain a sample video set, so that the scoring model has sufficient training data for training.

In block S22, the data pairs including first clips and second clips are obtained based on target attributes labeled by the one or more labeled clips and unlabeled clips included in the sample video.

In the sample video set, each sample video has one or more labeled clips and unlabeled clips. The labeled clips in each sample video are labeled based on the content, and target attributes of each labeled clip are clarified. Based on labeled target attributes, data pairs including first clips and second clips are obtained from labeled clips and unlabeled clips. A possibility of becoming a target clip for a first clip is greater than a possibility of becoming a target clip for a second clip. Based on the difference between the first clip and the second clip, the scoring model may accurately distinguish the feature difference among the target clips, the non-target clips and the unlabeled clips, thereby helping to improve the accuracy of the scoring model.

In some embodiments, in order to facilitate the scoring model to better distinguish the differences in the highlight degrees among different clips in the same video, when the data pair is obtained, the first clip and the second clip may be from the same sample video, so that the relative score difference between each clip may be obtained, which helps to distinguish the highlight degrees among various clips in the same video, and helps to make full use of the sample video. For example, for highlight videos of dunk, every dunk clip is a highlight clip. By using the data obtained from first clips and second clips of the same sample video to train the scoring model, the relative sizes between the scores of dunk clips may be obtained, which helps to distinguish relatively more highlight dunk clips, so as to facilitate the extraction of the target video.

In the embodiments of the disclosure, description is made by taking the target clip as the highlight video clip as an example.

When target attributes of the labeled clips in the labeled sample video are the attributes of target clips, the most highlight clip in the sample video is regarded as the clip with the attributes of target clips according to the content of the sample video, that is, the content of this clip is more exciting and attractive than the content in other moments in the same video. Furthermore, the start and end time points of the clip are labeled to obtain the labeled clip with the attributes of target clips. When non-target attributes of the labeled clips in the labeled sample video are the attributes of target clip, the least highlight clip in the sample video is regarded as the clip with the attributes of non-target clips according to the content of the sample video, that is, the content of this clip is less exciting and attractive than the content in other moments in the same video. Furthermore, the start and end time points of the clip are labeled to obtain the labeled clip with the attributes of non-target clip.

Figure 7:
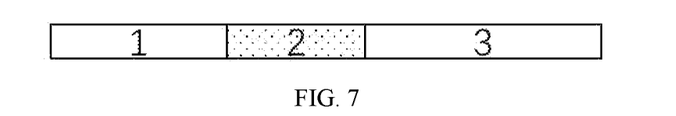
FIG. 7 is a schematic diagram illustrating a sample video labeling according to some embodiments of the disclosure.

In some embodiments, the sample video may include one or more labeled clips whose target attributes are attributes of target clips and unlabeled clips. When obtaining the data pairs, the one or more labeled clips may be used as first clips, and part of clips may be extracted from the unlabeled clips included in the sample video as second clips. When there is one labeled clip in the sample video, and the duration of the unlabeled clip is similar to the duration of the labeled clip, the labeled clip may be regarded as a first clip and the unlabeled clip may be regarded as a second clip to obtain the data pair needed during training. For example, as illustrated in FIG. 7, clip 2 is a labeled clip whose target attributes are attributes of target clips, and clip 1 and clip 3 are unlabeled clips. Furthermore, when the data pair is obtained, a data pair that clip 2 as a first clip and clip 1 is a second clip is obtained, and a data pair that clip 2 is a first clip and clip 3 is a second clip is obtained. When there is one labeled clip in the sample video, but the unlabeled clip is too long, the unlabeled clip may be splitted into multiple sub-unlabeled clips within a specified duration, and multiple data pairs may be obtained in which the labeled clip is a first clip, and the sub-unlabeled clips are second clips. This helps to reduce the difficulty of labeling, and a large number of training data pairs may be obtained by labeling a small number of labeled clips. For example, the sample video duration is 60 seconds, in which, the labeled clip is 10 seconds, and the unlabeled clip is 50 seconds. In order to facilitate the acquisition of a large number of training data pairs, the unlabeled clip may be splitted into multiple sub-unlabeled clips whose duration is similar to that of the labeled clip. When the unlabeled clip is splitted into multiple sub-unlabeled clips with less than 10 seconds, at least 5 sub-unlabeled clips may be obtained, for example: sub-unlabeled clip 1, sub-unlabeled clip 2, sub-unlabeled clip 3, sub-unlabeled clip 4, and sub-unlabeled clip 5. Furthermore, 5 data pairs used for the scoring model training may be obtained: the data pair that the labeled clip is the first clip, and the sub-unlabeled clip 1 is the second clip; the data pair that the labeled clip is the first clip, and the sub-unlabeled clip 2 is the second clip; the data pair that the labeled clip is the first clip, and the sub-unlabeled clip 3 is the second clip; the data pair that the labeled clip is the first clip, and the sub-unlabeled clip 4 is the second clip; and the data pair that the labeled clip is the first clip, and the sub-unlabeled clip 5 is the second clip.

Figure 8:
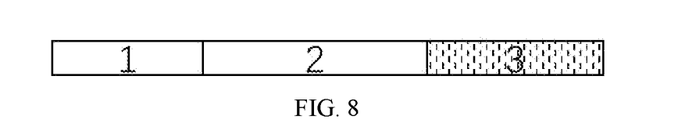
FIG. 8 is a schematic diagram illustrating another sample video labeling according to some embodiments of the disclosure.

In some embodiments, the sample video may include one or more labeled clips whose target attributes are attributes of non-target clips and unlabeled clips. When obtaining the data pairs, the one or more labeled clips may be used as second clips, and part of clips may be extracted from the unlabeled clips included in the sample video as positive and second clips. When there is one labeled clip in the sample video, and the duration of the unlabeled clip is similar to the duration of the labeled clip, the labeled clip may be regarded as a second clip and the unlabeled clip may be regarded as a first clip to obtain the data pair needed during training. For example, as illustrated in FIG. 8, clip 3 is a labeled clip whose target attributes are attributes of non-target clips, and clip 1 and clip 2 are unlabeled clips. Furthermore, when the data pair is obtained, a data pair that clip 1 is a first clip and clip 3 is a second clip is obtained, and a data pair that clip 2 is a first clip and clip 3 is a second clip is obtained. When there is one labeled clip in the sample video, but the unlabeled clip is too long, the unlabeled clip may be splitted into multiple sub-unlabeled clips within a specified duration, and multiple data pairs may be obtained in which the labeled clip is the second clip, and the sub-unlabeled clips are first clips. This helps to reduce the difficulty of labeling, and a large number of training data pairs may be obtained by labeling a small number of labeled clips.

Figure 9:
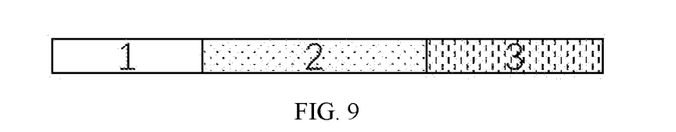
FIG. 9 is a schematic diagram illustrating another sample video labeling according to some embodiments of the disclosure.

In some embodiments, the sample video may include one or more labeled clips whose target attributes are attributes of target clips, one or more labeled clips whose target attributes are attributes of non-target clips, and unlabeled clips. The data pairs may include at least one or a combination of the following data pairs: data pairs including the first clips and the second clips, data pairs including the first clips and a part of clips as second clips, or data pair including the second clips and a part of clips as first clips. That is, when the data pair is obtained, the labeled clip labeled with the attributes that characterize target clips is regarded as a first clip, the labeled clip labeled with the attributes that characterize non-target clips is regarded as a second clip, or the part exacted from the unlabeled clips is regarded as a second clip. When the labeled clip labeled with the attributes that characterizes non-target clips is regarded as a second clip, the labeled clip labeled with the attributes that characterizes target clips is regarded as a first clip, or the part exacted from the unlabeled clips is regarded as a first clip. For example, as illustrated in FIG. 9, clip 2 is a labeled clip with the attributes characterizing attributes of target clips, clip 3 is a labeled clip with the attributes characterizing attributes of non-target clips, and clip 1 is an unlabeled clip. Furthermore, when the data pair is obtained, the data pair that clip 2 is a first clip and clip 1 is a second clip; the data pair that clip 2 is a first clip and clip 3 is a second clip; and the data pair that clip 1 is a first clip and clip 3 is a second clip, may be obtained.

By obtaining labeled training data pairs may effectively reduce the generation of noisy data and avoid the interference of noisy data, thereby helping to improve the cleanliness of training data, making the structure of the scoring model simple. There is no need to use other network models or add other parameters to improve the reliability of the training data, and the training difficulty is low, which helps to accelerate the convergence of the scoring model during the training process.

Figure 10:
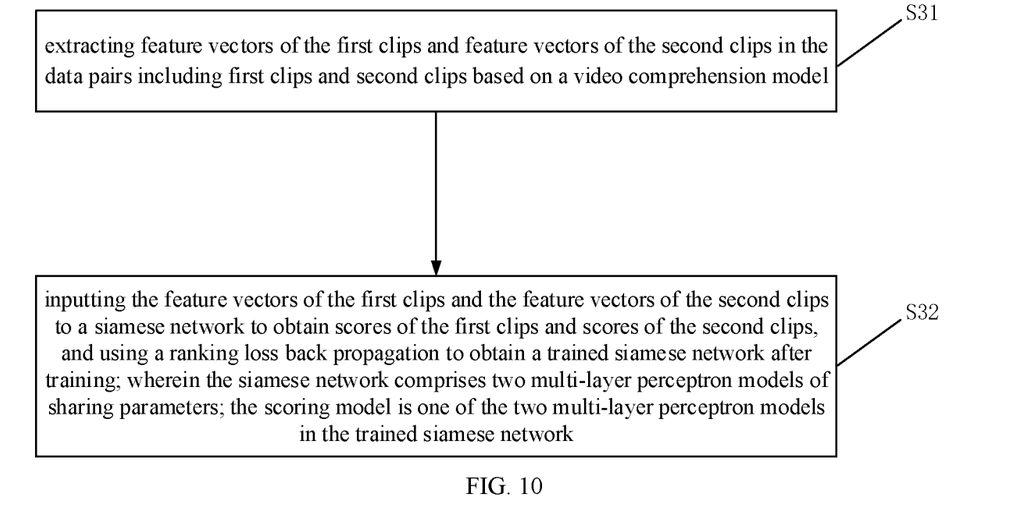
FIG. 10 is a flow chart illustrating a method for training a scoring model according to some embodiments of the disclosure.

FIG. 10 is a flow chart illustrating a method for training a scoring model according to some embodiments of the disclosure. In the disclosure, the scoring model is obtained by training based on data pairs including first clips and second clips. As illustrated in FIG. 10, the method for training the scoring model includes actions in the following block S31 to block S32.

In block S31, feature vectors of the first clips and feature vectors of the second clips in the data pairs including first clips and second clips are extracted based on a video comprehension model.

In the embodiments of the disclosure, feature vectors of the first clips and of the second clips in the data pairs are extracted based on the video comprehension model, to obtain the feature vectors of the first clips and the feature vectors of the second clips. The feature vectors of the first clips and the feature vectors of the second clips are used as the input of the scoring model to train the scoring model to obtain the scores of the first clips and the scores of the second clips. By extracting the feature vectors of the first clips and of the second clips, it is helpful for the scoring model to learn the similarity and difference among the content of different clips during the training process, and it is convenient to improve the accuracy of scoring. The video comprehension model may include: a convolutional three-dimensional neural network (C3D), an inflated 3D ConvNet or a temporal segment network (TSN), which is not limited in this disclosure. When using the video understanding model for feature vector extraction, the output vector previous to the classification layer of the video understanding model may be used as the feature vector of the input clip.

In block S32, the feature vectors of the first clips and the feature vectors of the second clips are inputted to a siamese network to obtain scores of the first clips and scores of the second clips, and a ranking loss is used for back propagation to obtain a trained siamese network after training; in which the siamese network includes two multi-layer perceptron models of sharing parameters; the scoring model is one of the two multi-layer perceptron models in the trained siamese network.

In the embodiments of the disclosure, the scoring model may be obtained from a multi-layer perceptron model. By copying a multi-layer perceptron model and sharing parameters, a siamese network is obtained, and the trained scoring model is obtained by training the siamese network. When training based on data pairs including first clips and second clips, the obtained feature vectors of the first clips and the obtained feature vectors of the second clips may be inputted at the same time to obtain the scores of the first clips and the scores of the second clips. The loss value is calculated according to the scores of the first clips and of the second clips, and the siamese network is trained through the back-propagation algorithm. The number of hidden layers of the multi-layer perceptron may be set to 2~4. For example, when the dimension of the video feature vector is N, the input dimension of the first fully-connected layer of the multi-layer perceptron is N, and the output dimension of the last fully-connected layer is 1. During training, the feature vectors of the first clips and the feature vectors of the second clips in the data pair are sequentially inputted into the siamese network constructed by the multi-layer perceptron models to obtain the score of each clip.

The ranking loss function is used to perform back propagation to the scores that are outputted from the scoring model to adjust parameters and weights in the siamese network, thereby improving the accuracy of the scoring model and accelerating the convergence rate of the scoring model during the training process. In some embodiments, the feature vector of a first clip is recorded as $S^+$, and the feature vector of a second clip is recorded as $S^-$, and the ranking loss may be recorded as the following form of: $L(S^+, S^-)=\max(0,1-MLP(S^+)+MLP(S^-))$, in which, $MLP(S^+)$ and $MLP(S^-)$ respectively represent the scores of the first clip and the second clip outputted by the siamese network.

Through the above method for training the scoring model, the cleanliness of training data may be improved based on the labeling of labeled clips, thereby effectively avoiding the mixing of noisy data and improving the quality of training data. Based on high-quality training data, when training the scoring model, a simple multi-layer perceptron model may be directly used for training, which helps reduce the difficulty of training, facilitates rapid acquisition of the effective scoring model, and helps save the training cost.

In some embodiments, when the number of samples of data pairs used for training is small, the trained video comprehension model may be used to extract feature vectors of the labeled clips, and the obtained feature vectors of the labeled clips are inputted to the multi-layer perception model to train the scoring model. When the number of samples used for training is large enough, the scoring model may include the video comprehension model and the multi-layer perceptron model, and the video comprehension model and the multi-layer perceptron model are jointly trained to improve the matching rate between the two and to improve the accuracy of the video comprehension model and the multi-layer perceptron model.

In an implementation scenario, after the scoring model is trained, the obtained scoring model may directly score the obtained clips. Scoring the clips through the scoring model may be understood as obtaining the scores corresponding to the clips from a branch network of the trained siamese network. For different clips of the same video, the relative sizes of the scores output by the scoring model may be regarded as differences of the relative highlight degrees among different clips. That is, in the same video, the higher the score of the clip is, the higher the highlight degree is. In order to facilitate the extraction of highlight clips in the video, the obtained video needs to be splitted into the multiple clips first, and the feature vectors of the clips are extracted through the trained video comprehension model.

The feature vectors of the clips are inputted to the trained multi-layer perceptron for scoring, and scores corresponding to the clips are obtained. According to the corresponding scores of the clips, the clips are ranked according to the scores, in which the clip with the highest score is the most highlight clip of the video. The clip with the highest score may be extracted, which helps the user to quickly obtain the most highlight content in the video in a short period of time, thereby improving the user experience. Several clips with higher scores may also be used as several highlight clips of the video, which helps the user quickly obtain the main content of the video in a short period of time and understand the main content plot of the video, thereby saving unnecessary waste of time.

Based on the same idea, an apparatus for extracting a video clip is provided in the embodiments of the disclosure.

It may be understood that the apparatus for extracting the video clip in the embodiments of the disclosure includes hardware structures and/or software modules corresponding to execute specific functions with the aim to realize the above functions. Combined with units and algorithm actions of examples of embodiments disclosed in this disclosure, the embodiments may be realized by hardware or the combination of hardware and computer software. Whether some function is executed by hardware or driving hardware via computer software determines by specific applications and design constraints of the technical methods. Those skilled in the art may use different methods for each specific application to realize the described functions, but such realization should not be considered as going beyond the scope of the technical solutions of the embodiments of the disclosure.

Figure 11:
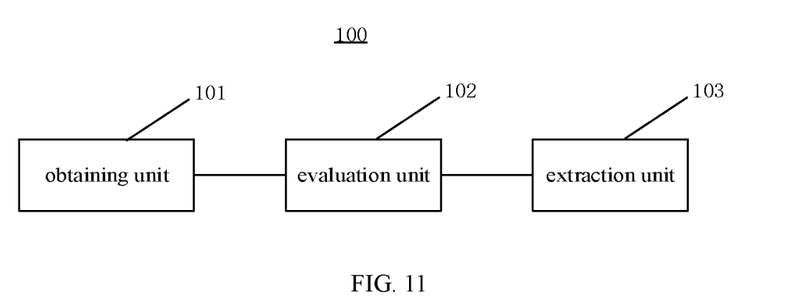
FIG. 11 is a block diagram illustrating an apparatus for extracting a video clip according to some embodiments of the disclosure.

FIG. 11 is a block diagram illustrating an apparatus for extracting a video clip according to some embodiments of the disclosure. According to FIG. 11, the apparatus 100 for extracting the video clip includes an obtaining unit 101, an evaluation unit 102, and an extraction unit 103.

The obtaining unit 101 is configured to obtain a video, and split the video into multiple clips.

The evaluation unit 102 is configured to input the multiple clips into a pre-trained scoring model to obtain a score of each of the multiple clips. The scoring model is obtained by training based on data pairs including first clips and second clips, the data pairs including first clips and second clips are obtained based on labeled clips labeled with target attributes, and the target attributes include attributes that characterize clips as target clips or non-target clips.

The extraction unit 103 is configured to extract a target clip from the multiple clips based on the score of each of the multiple clips.

In some embodiments, the data pairs including first clips and second clips are obtained based on the labeled clips labeled with the target attributes by actions of: obtaining a sample video including one or more labeled clips; and obtaining the data pairs including first clips and second clips based on target attributes labeled by the one or more labeled clips and unlabeled clips included in the sample video, in which a possibility of becoming a target clip for a first clip is greater than a possibility of becoming a target clip for a second clip.

In some embodiments, the data pairs including first clips and second clips are obtained based on the target attributes labeled by the one or more labeled clips and the unlabeled clips included in the sample video, includes: in response that the target attributes labeled by the one or more labeled clips include attributes that characterize clips as target clips, employing the one or more labeled clips as first clips and exacting part of clips of unlabeled clips included in the sample video as second clips, to obtain one or more data pairs including first clips and second clips; or in response that the target attributes labeled by the one or more labeled clips include attributes that characterize clips as non-target clips, employing the one or more labeled clips as second clips and exacting part of clips of unlabeled clips included in the sample video as first clips, to obtain one or more data pairs including first clips and second clips; or in response that the target attributes labeled by the one or more labeled clips include attributes that characterize clips as target clips and attributes that characterize clips as non-target clips, employing labeled clips that are labeled with the attributes that characterize clips as target clips as first clips and labeled clips that are labeled with the attributes that characterize clips as non-target clips as second clips, and exacting part of clips of unlabeled clips included in the sample video, to obtain one or more data pairs including first clips and second clips; in which the data pairs include at least one or a combination of: data pairs including the first clips and the second clips, data pairs including the first clips and the part of clips as the second clips, and data pairs including the second clips and the part of clips as the first clips.

In some embodiments, the scoring model is obtained by training based on the data pairs including first clips and second clips by actions of: extracting feature vectors of the first clips and feature vectors of the second clips in the data pairs including first clips and second clips based on a video comprehension model; and inputting the feature vectors of the first clips and the feature vectors of the second clips to a siamese network to obtain scores of the first clips and scores of the second clips, and using a ranking loss back propagation to obtain a trained siamese network after training; in which the siamese network includes two multi-layer perceptron models of sharing parameters; the scoring model is one of the two multi-layer perceptron models in the trained siamese network.

In another embodiment, the multiple clips are inputted into the pre-trained scoring model by the evaluation unit 102 to obtain the score of each of the multiple clips by actions of: inputting the multiple clips to a video comprehension model, extracting a feature vector of each of the multiple clips based on the video comprehension model, and inputting the feature vector of each of the multiple clips to a multi-layer perceptron model to obtain the score of each of the multiple clips.

In some embodiments, the video is splitted by the obtaining unit 101 into the multiple clips by actions of: splitting the video into the multiple clips by adopting a video shot boundary detection manner to obtain the multiple clips of the video; or splitting the video into the multiple clips based on a sliding window to obtain the multiple clips of the video.

Regarding to the apparatuses in the above embodiments, the specific operation manners in which each module performs has been described in detail in the embodiments of the methods, and will not be elaborated herein.

Figure 12:
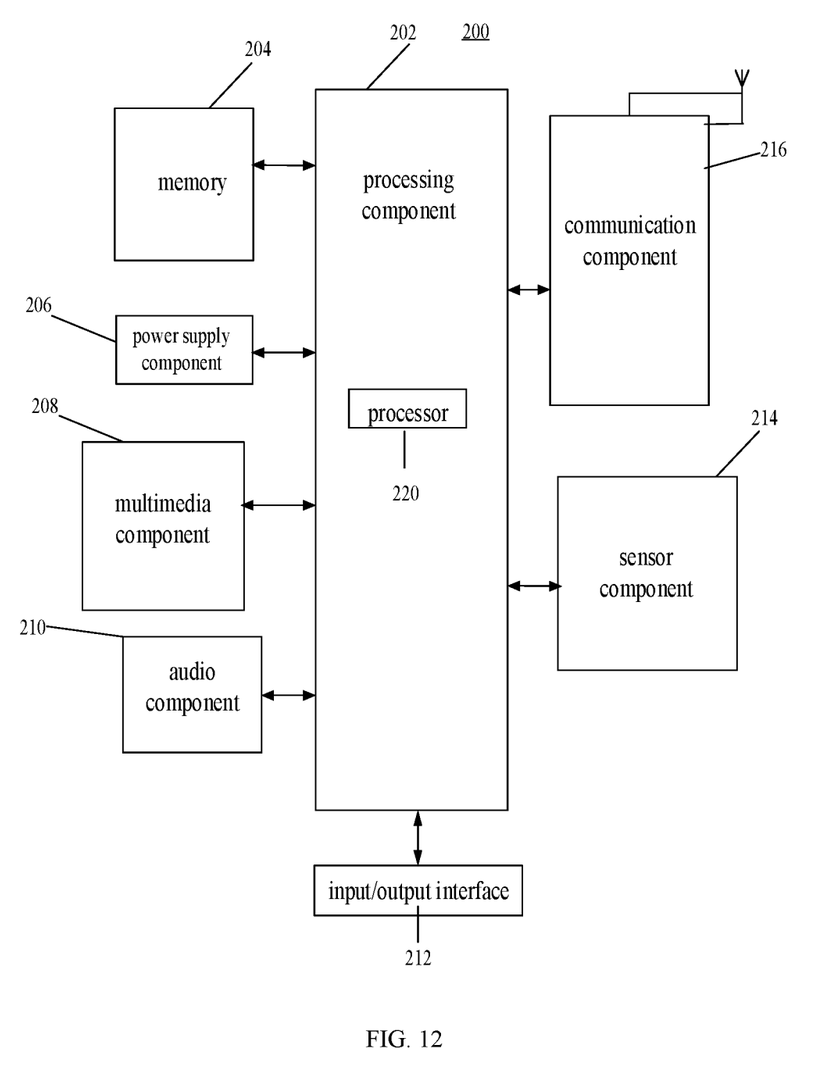
FIG. 12 is a block diagram illustrating a device for extracting a video clip according to some embodiments of the disclosure.

FIG. 12 is a block diagram illustrating a device 200 for extracting a video clip according to some embodiments of the disclosure. For example, the device 200 may be a mobile phone, a computer, a digital broadcasting terminal, a messaging device, a game console, a tablet device, a medical device, a fitness device, a personal digital assistant, etc.

According to FIG. 12, the device 200 may include one or more of the following components: a processing component 202, a memory 204, a power supply component 206, a multimedia component 208, an audio component 210, an input/output (I/O) interface 212, a sensor component 214, and a communication component 216.

The processing component 202 typically controls overall operations of the device 200, such as the operations associated with display, telephone calls, data communications, camera operations, and recording operations. The processing component 202 may include one or more processors 220 to execute instructions to perform all or part of the actions in the above described methods. In addition, the processing component 202 may include one or more modules to facilitate the interaction between the processing component 202 and other components. For example, the processing component 202 may include a multimedia module to facilitate the interaction between the multimedia component 208 and the processing component 202.

The memory 204 is configured to store various types of data to support operations on the device 200. Examples of these data include instructions for any application or method operating on the device 200, such as contact data, phone book data, messages, pictures, videos, and so on. The memory 204 can be implemented by any type of volatile or non-volatile storage device or their combination, such as static Random Access Memory (SRAM), Electrically Erasable Programmable Read-Only Memory (EEPROM), Erasable and Programmable Read-Only Memory (EPROM), Programmable Read-Only Memory (PROM), Read-Only Memory (ROM), magnetic memory, flash memory, magnetic disk or optical disk.

The power supply component 206 provides power for various components of the device 200. The power supply component 206 may include a power management system, one or more power supplies, and other components associated with the generation, management, and distribution of power for the device 200.

The multimedia component 208 includes a screen that provides an output interface between the device 200 and the user. In some embodiments, the screen may include a liquid crystal display (LCD) and a touch panel (TP). If the screen includes a touch panel, the screen may be used as a touch screen to receive input signals from the user. The touch panel includes one or more touch sensors to sense touch, slide, and gestures on the touch panel. The touch sensors may not only sense a boundary of a touch or swipe action, but also sense a period of time and a pressure associated with the touch or swipe action. In some embodiments, the multimedia component 208 includes a front camera and/or a rear camera. The front camera and/or the rear camera may receive an external multimedia datum while the device 200 is in an operation mode, such as a photographing mode or a video mode. Each of the front camera and the rear camera may be a fixed optical lens system or have focus and optical zoom capability.

The audio component 210 is configured to output and/or input audio signals. For example, the audio component 210 includes a microphone (MIC). When the device 200 is in an operation mode, such as a call mode, a recording mode, and a voice recognition mode, the microphone is configured to receive external audio signals. The received audio signal may be further stored in the memory 204 or transmitted via the communication component 216. In some embodiments, the audio component 210 further includes a speaker to output audio signals.

The I/O interface 212 provides an interface between the processing component 202 and the peripheral interface module. The peripheral interface module may be a keyboard, a click wheel, a button, and so on. These buttons may include but are not limited to: home button, volume button, start button, and lock button.

The sensor component 214 includes one or more sensors to provide status assessments of various aspects of the device 200. For example, the sensor component 214 may detect the on/off state of the device 200 and relative position of components, for example, components as the display and the keypad of the device 200. The sensor component 214 may also detect changes of the position of the device 200 or one component of the device 200, and the presence or absence of contact between a user and the device 200, the position or acceleration/deceleration of the device 200, and the temperature change of the device 200. The sensor component 214 may include a proximity sensor configured to detect the presence of nearby objects without any physical contact. The sensor component 214 may also include a light sensor, such as a CMOS or CCD image sensor for the imaging applications. In some embodiments, the sensor component 214 may also include an accelerometer sensor, a gyroscope sensor, a magnetic sensor, a pressure sensor, or a temperature sensor.

The communication component 216 is configured to facilitate wired or wireless communication between the device 200 and other devices. The device 200 may get access to a wireless network based on the communication standard, such as Wi-Fi, 2G (2-Generation wireless telephone technology) or 3G (3-Generation wireless telephone technology), or their combinations. In one exemplary embodiment, the communication component 216 receives a broadcast signal or broadcast associated information from an external broadcast management system via a broadcast channel. In one exemplary embodiment, the communication component 216 further includes a near field communication (NFC) module to facilitate short-range communications. For example, the NFC module can be implemented based on Radio Frequency Identification (RFID) technology, Infrared Data Association (IrDA) technology, Ultra-Wide Band (UWB) technology, Blue Tooth (BT) technology and other technologies.

In some embodiments of the disclosure, the device 200 may be implemented by one or more application specific integrated circuits (ASIC), digital signal processors (DSP), digital signal processing devices (DSPD), programmable logic devices (PLD), field-programmable gate array (FPGA), controller, micro-controller, microprocessor, or other electronic components, for performing the above methods.

In exemplary embodiments, there is also provided a non-transitory computer-readable storage medium including instructions, such as included in the memory 204, executable by the processor 220 in the device 200, for performing the above methods. For example, the non-transitory computer-readable storage medium may be a ROM, a RAM, a CD-ROM, a magnetic tape, a floppy disc, an optical data storage device, and the like.

It can be further understood that in the disclosure, "multiple" refers to two or more than two, and other quantifiers are similar. "And/or" describes the association of the associated object, indicating that there can be three types of relationships, for example, A and/or B, which means: A exists alone, A and B exist at the same time, and B exists alone. The character "/" generally indicates that the associated objects before and after are in an "or" relationship. The singular forms "a", "the" and "this" are also intended to include plural forms, unless the context clearly indicates other meanings.

It can be further understood that although the terms "first", "second", etc. may be adopted in the disclosure to describe various information, the information is not limited to these terms. These terms are only used to distinguish the same type of information from each other, and do not indicate a specific order or degree of importance. In fact, expressions such as "first" and "second" can be used interchangeably. For example, without departing from the scope of the disclosure, first information may also be referred to as second information, and similarly, second information may also be referred to as first information.

It can be further understood that, unless otherwise specified, the word "connect" includes a direct connection between the two without other components, and also includes an indirect connection between the two with other elements.

It can be further understood that although the operations in the embodiments of the disclosure are described in a specific order in the drawings, they should not be understood as requiring these operations to be performed in the specific order shown or in a serial order, or requiring to perform all the operations shown to get the desired result. In certain circumstances, multitasking and parallel processing may be favorable.

Other embodiments of the disclosure will be apparent to those skilled in the art from consideration of the specification and practice of the disclosure disclosed here. This application is intended to cover any variations, uses, or adaptations of the disclosure following the general principles thereof and including such departures from the disclosure as come within known or customary practice in the art. It is intended that the specification and examples be considered as exemplary only, with a true scope and spirit of the disclosure being indicated by the following claims.

It should be understood that the disclosure is not limited to the precise structure described above and shown in the drawings, and various modifications and changes can be made without departing from its scope. The scope of the disclosure is only limited by the appended claims.

What is claimed is:

1. A method for extracting a video clip, comprising:
   obtaining a video, and splitting the video into multiple clips;
   inputting the multiple clips into a pre-trained scoring model, to obtain a score of each of the multiple clips, wherein the scoring model is obtained by training based on data pairs including first clips and second clips, the data pairs including first clips and second clips are obtained based on labeled clips labeled with target attributes, and the target attributes include attributes that characterize clips as target clips or non-target clips; and
   extracting a target clip from the multiple clips based on the score of each of the multiple clips.

2. The method as claimed in claim 1, wherein the data pairs including first clips and second clips are obtained based on the labeled clips labeled with the target attributes by actions of:
   obtaining a sample video including one or more labeled clips; and
   obtaining the data pairs including first clips and second clips based on target attributes labeled by the one or more labeled clips and unlabeled clips included in the sample video, wherein a possibility of becoming a target clip for a first clip is greater than a possibility of becoming a target clip for a second clip.

3. The method as claimed in claim 2, wherein obtaining the data pairs including first clips and second clips based on the target attributes labeled by the one or more labeled clips and the unlabeled clips included in the sample video, comprises:

in response that the target attributes labeled by the one or more labeled clips include attributes that characterize clips as target clips, employing the one or more labeled clips as first clips and exacting part of clips of unlabeled clips included in the sample video as second clips, to obtain one or more data pairs including first clips and second clips; or in response that the target attributes labeled by the one or more labeled clips include attributes that characterize clips as non-target clips, employing the one or more labeled clips as second clips and exacting part of clips of unlabeled clips included in the sample video as first clips, to obtain one or more data pairs including first clips and second clips; or in response that the target attributes labeled by the one or more labeled clips include attributes that characterize clips as target clips and attributes that characterize clips as non-target clips, employing labeled clips that are labeled with the attributes that characterize clips as target clips as first clips and labeled clips that are labeled with the attributes that characterize clips as non-target clips as second clips, and exacting part of clips of unlabeled clips included in the sample video, to obtain one or more data pairs including first clips and second clips; wherein the data pairs include at least one or a combination of: data pairs including the first clips and the second clips, data pairs including the first clips and the part of clips as the second clips, and data pairs including the second clips and the part of clips as the first clips.

4. The method as claimed in claim 2, wherein the scoring model is obtained by training based on the data pairs including first clips and second clips by actions of:

extracting feature vectors of the first clips and feature vectors of the second clips in the data pairs including first clips and second clips based on a video comprehension model; and inputting the feature vectors of the first clips and the feature vectors of the second clips to a siamese network to obtain scores of the first clips and scores of the second clips, and using a ranking loss back propagation to obtain a trained siamese network after training; wherein the siamese network comprises two multi-layer perceptron models of sharing parameters; the scoring model is one of the two multi-layer perceptron models in the trained siamese network.

5. The method as claimed in claim 1, wherein inputting the multiple clips into the pre-trained scoring model to obtain the score of each of the multiple clips, comprises:

inputting the multiple clips to a video comprehension model, extracting a feature vector of each of the multiple clips based on the video comprehension model, and inputting the feature vector of each of the multiple clips to a multi-layer perceptron model to obtain the score of each of the multiple clips.

6. The method as claimed in claim 1, wherein splitting the target video into the multiple clips comprises:

splitting the video into the multiple clips by adopting a video shot boundary detection manner to obtain the multiple clips of the video; or splitting the video into the multiple clips based on a sliding window to obtain the multiple clips of the video.

7. A device for extracting a video clip, comprising:
a memory, configured to store instructions; and
a processor, configured to execute the instructions stored in the memory to:

obtain a video, and split the video into multiple clips;

input the multiple clips into a pre-trained scoring model, to obtain a score of each of the multiple clips, wherein the scoring model is obtained by training based on data pairs including first clips and second clips, the data pairs including first clips and second clips are obtained based on labeled clips labeled with target attributes, and the target attributes include attributes that characterize clips as target clips or non-target clips; and extract a target clip from the multiple clips based on the score of each of the multiple clips.

8. The device as claimed in claim 7, wherein the processor is configured to obtain the data pairs including first clips and second clips based on the labeled clips labeled with the target attributes by actions of:

obtaining a sample video including one or more labeled clips; and obtaining the data pairs including first clips and second clips based on target attributes labeled by the one or more labeled clips and unlabeled clips included in the sample video, wherein a possibility of becoming a target clip for a first clip is greater than a possibility of becoming a target clip for a second clip.

9. The device as claimed in claim 8, wherein the processor is configured to obtain the data pairs including first clips and second clips based on the target attributes labeled by the one or more labeled clips and the unlabeled clips included in the sample video, by actions of:

in response that the target attributes labeled by the one or more labeled clips include attributes that characterize clips as target clips, employing the one or more labeled clips as first clips and exacting part of clips of unlabeled clips included in the sample video as second clips, to obtain one or more data pairs including first clips and second clips; or in response that the target attributes labeled by the one or more labeled clips include attributes that characterize clips as non-target clips, employing the one or more labeled clips as second clips and exacting part of clips of unlabeled clips included in the sample video as first clips, to obtain one or more data pairs including first clips and second clips; or in response that the target attributes labeled by the one or more labeled clips include attributes that characterize clips as target clips and attributes that characterize clips as non-target clips, employing labeled clips that are labeled with the attributes that characterize clips as target clips as first clips and labeled clips that are labeled with the attributes that characterize clips as non-target clips as second clips, and exacting part of clips of unlabeled clips included in the sample video, to obtain one or more data pairs including first clips and second clips; wherein the data pairs include at least one or a combination of: data pairs including the first clips and the second clips, data pairs including the first clips and the part of clips as the second clips, and data pairs including the second clips and the part of clips as the first clips.

10. The device as claimed in claim 8, wherein the processor is configured to obtain the scoring model by training based on the data pairs including first clips and second clips by actions of:

extracting feature vectors of the first clips and feature vectors of the second clips in the data pairs including first clips and second clips based on a video comprehension model; and inputting the feature vectors of the first clips and the feature vectors of the second clips to a siamese network to obtain scores of the first clips and scores of the second clips, and using a ranking loss back propagation to obtain a trained siamese network after training; wherein the siamese network comprises two multi-layer perceptron models of sharing parameters; the scoring model is one of the two multi-layer perceptron models in the trained siamese network.

11. The device as claimed in claim 7, wherein the processor is configured to input the multiple clips into the pre-trained scoring model to obtain the score of each of the multiple clips by actions of:

inputting the multiple clips to a video comprehension model, extracting a feature vector of each of the multiple clips based on the video comprehension model, and inputting the feature vector of each of the multiple clips to a multi-layer perceptron model to obtain the score of each of the multiple clips.

12. The device as claimed in claim 7, wherein the processor is configured to split the target video into the multiple clips by actions of:

splitting the video into the multiple clips by adopting a video shot boundary detection manner to obtain the multiple clips of the video; or splitting the video into the multiple clips based on a sliding window to obtain the multiple clips of the video.

13. A non-transitory computer-readable storage medium having stored therein instructions that, when executed by a processor, causes the processor to perform a method for extracting a video clip, the method including:

obtaining a video, and splitting the video into multiple clips;

inputting the multiple clips into a pre-trained scoring model, to obtain a score of each of the multiple clips, wherein the scoring model is obtained by training based on data pairs including first clips and second clips, the data pairs including first clips and second clips are obtained based on labeled clips labeled with target attributes, and the target attributes include attributes that characterize clips as target clips or non-target clips; and extracting a target clip from the multiple clips based on the score of each of the multiple clips.

14. The non-transitory computer-readable storage medium as claimed in claim 13, wherein the data pairs including first clips and second clips are obtained based on the labeled clips labeled with the target attributes by actions of:

obtaining a sample video including one or more labeled clips; and obtaining the data pairs including first clips and second clips based on target attributes labeled by the one or more labeled clips and unlabeled clips included in the sample video, wherein a possibility of becoming a target clip for a first clip is greater than a possibility of becoming a target clip for a second clip.

15. The non-transitory computer-readable storage medium as claimed in claim 14, wherein obtaining the data pairs including first clips and second clips based on the target attributes labeled by the one or more labeled clips and the unlabeled clips included in the sample video, comprises:

in response that the target attributes labeled by the one or more labeled clips include attributes that characterize clips as target clips, employing the one or more labeled clips as first clips and exacting part of clips of unlabeled clips included in the sample video as second clips, to obtain one or more data pairs including first clips and second clips; or in response that the target attributes labeled by the one or more labeled clips include attributes that characterize clips as non-target clips, employing the one or more labeled clips as second clips and exacting part of clips of unlabeled clips included in the sample video as first clips, to obtain one or more data pairs including first clips and second clips; or in response that the target attributes labeled by the one or more labeled clips include attributes that characterize clips as target clips and attributes that characterize clips as non-target clips, employing labeled clips that are labeled with the attributes that characterize clips as target clips as first clips and labeled clips that are labeled with the attributes that characterize clips as non-target clips as second clips, and exacting part of clips of unlabeled clips included in the sample video, to obtain one or more data pairs including first clips and second clips; wherein the data pairs include at least one or a combination of: data pairs including the first clips and the second clips, data pairs including the first clips and the part of clips as the second clips, and data pairs including the second clips and the part of clips as the first clips.

16. The non-transitory computer-readable storage medium as claimed in claim 14, wherein the scoring model is obtained by training based on the data pairs including first clips and second clips by actions of:

extracting feature vectors of the first clips and feature vectors of the second clips in the data pairs including first clips and second clips based on a video comprehension model; and inputting the feature vectors of the first clips and the feature vectors of the second clips to a siamese network to obtain scores of the first clips and scores of the second clips, and using a ranking loss back propagation to obtain a trained siamese network after training; wherein the siamese network comprises two multi-layer perceptron models of sharing parameters; the scoring model is one of the two multi-layer perceptron models in the trained siamese network.

17. The non-transitory computer-readable storage medium as claimed in claim 13, wherein inputting the multiple clips into the pre-trained scoring model to obtain the score of each of the multiple clips, comprises:

inputting the multiple clips to a video comprehension model, extracting a feature vector of each of the multiple clips based on the video comprehension model, and inputting the feature vector of each of the multiple clips to a multi-layer perceptron model to obtain the score of each of the multiple clips.

18. The non-transitory computer-readable storage medium as claimed in claim 13, wherein splitting the target video into the multiple clips comprises:

splitting the video into the multiple clips by adopting a video shot boundary detection manner to obtain the multiple clips of the video; or splitting the video into the multiple clips based on a sliding window to obtain the multiple clips of the video.

* * * * *